June 17, 1941.  E. ELISON  2,246,034
WINDING DEVICE FOR CAMERAS
Filed July 4, 1939  2 Sheets-Sheet 1

INVENTOR
ELI ELISON
BY
ATTORNEY

June 17, 1941.                    E. ELISON                       2,246,034
                          WINDING DEVICE FOR CAMERAS
                            Filed July 4, 1939              2 Sheets-Sheet 2
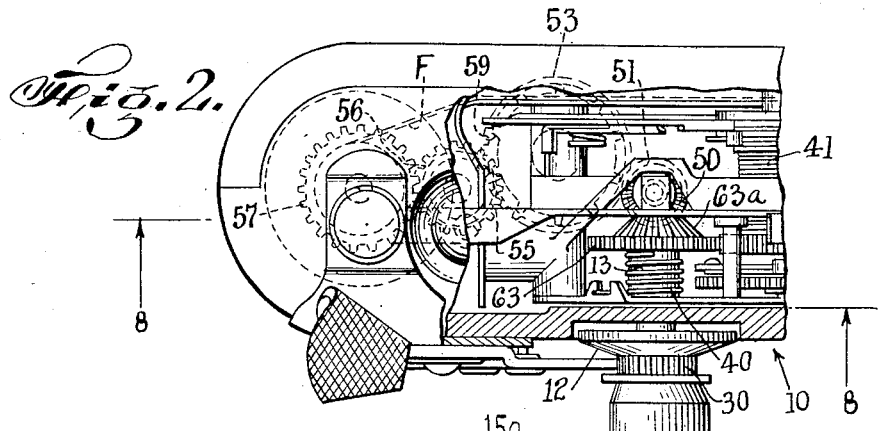
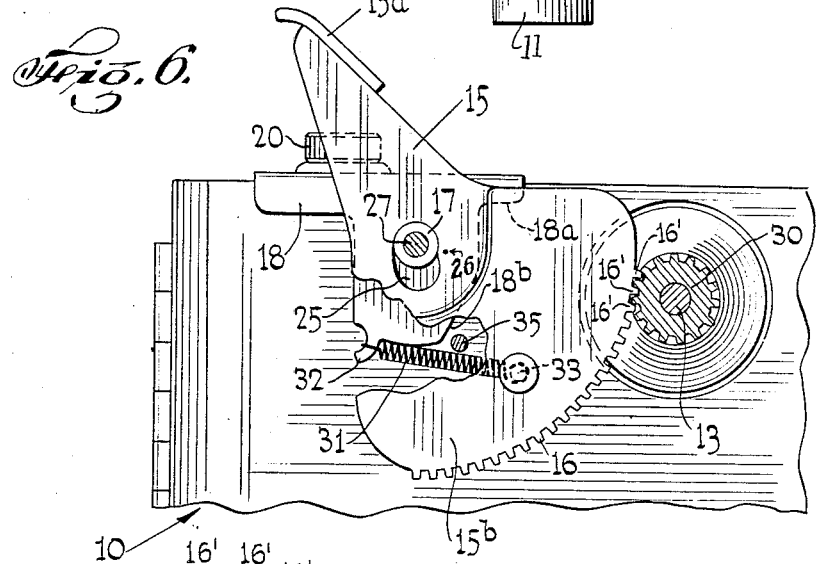
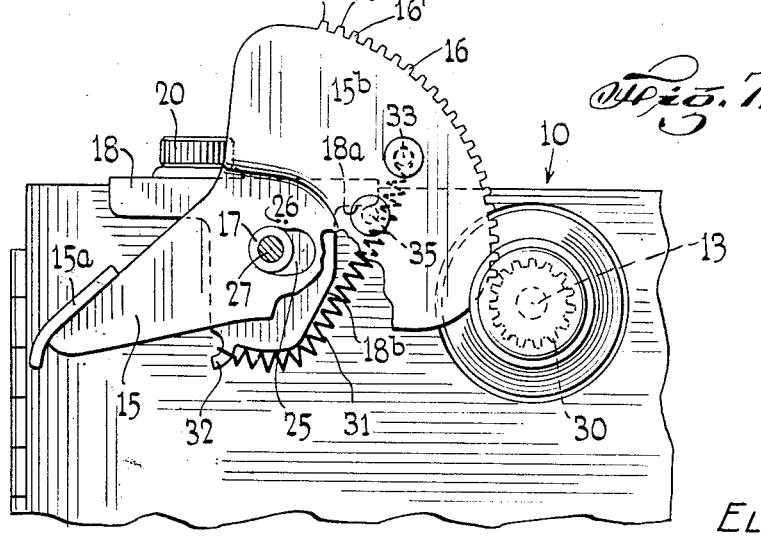
INVENTOR
ELI ELISON
BY
ATTORNEY Patented June 17, 1941

2,246,034

UNITED STATES PATENT OFFICE 2,246,034

WINDING DEVICE FOR CAMERAS

Eli Elison, Jackson Heights, N. Y., assignor to Universal Camera Corporation, New York, N. Y., a corporation of Delaware Application July 4, 1939, Serial No. 282,763

12 Claims. (Cl. 242—71)

This invention relates generally to cameras. More particularly, my invention relates to a camera construction having an improved mechanism for rapidly winding up a camera for a subsequent picture.

One of the objects of my invention is to provide, in a camera of the character described, an improved rapid winding mechanism whereby the camera may be wound up for the taking of a subsequent picture by a single rapid stroke of a finger or hand, and without moving the camera from its aligned position.

Another object of my invention is to provide an improved rapid winding mechanism of the character described adapted to be attached to a camera having a manually operated winding knob, such a camera for example as the type disclosed in Patent No. 2,233,390 of Feb. 25, 1941.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the claims.

In the accompanying drawings, in which is shown one of the various possible embodiments of this invention, Fig. 1 is a front elevational view of a portion of a camera with the improved rapid winding mechanism of my invention mounted thereon;

Fig. 2 is a top plan view thereof;

Figs. 6 and 7 are views similar to Fig. 4, but illustrating steps in the operation thereof.

Figure 1:
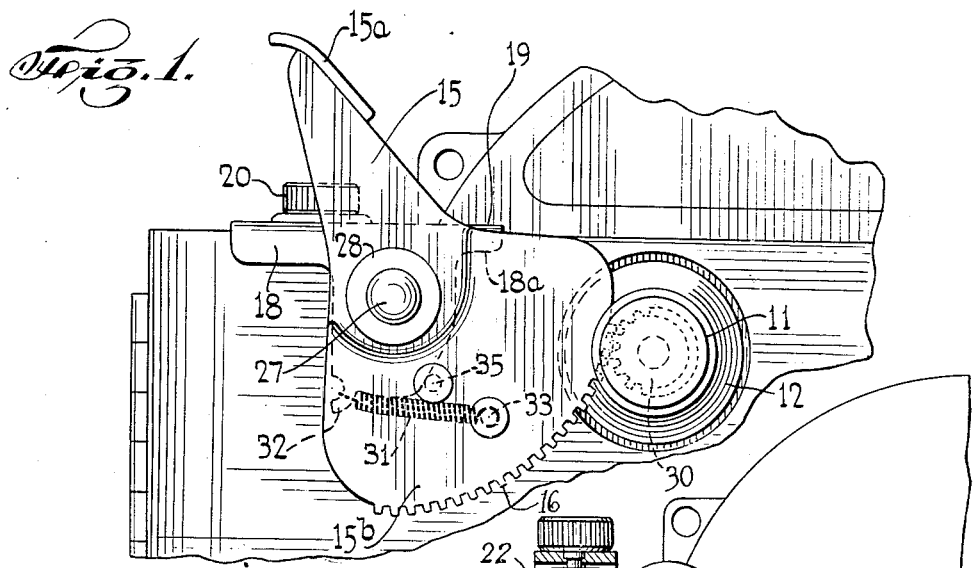

While, as hereinbefore explained, the rapid winding mechanism of my invention is adapted for use with any type of camera having a manually operated knob for the winding of the film, there is disclosed in the drawings a camera 10 which is of the so-called "candid camera" type and which is provided with a rotatably mounted winding knob 11 carrying a counting dial 12 and adapted by means of suitable gearing disposed within the camera, when the said knob is rotated, to wind a shutter spring 41 and at the same time to advance the film a measured amount, so that it will be in readiness for the taking of a subsequent picture. The knob 11 is fixed to a shaft 13 for rotation therewith, the said shaft 13 being suitably journalled in a bearing within the camera and projecting through an opening in the front camera casing wall.

The following means are employed for winding the film F on the take-up spool 42 after passing the exposure aperture, such means being fully disclosed and described in the said Patent No. 2,233,390.

Figures 5, 8:
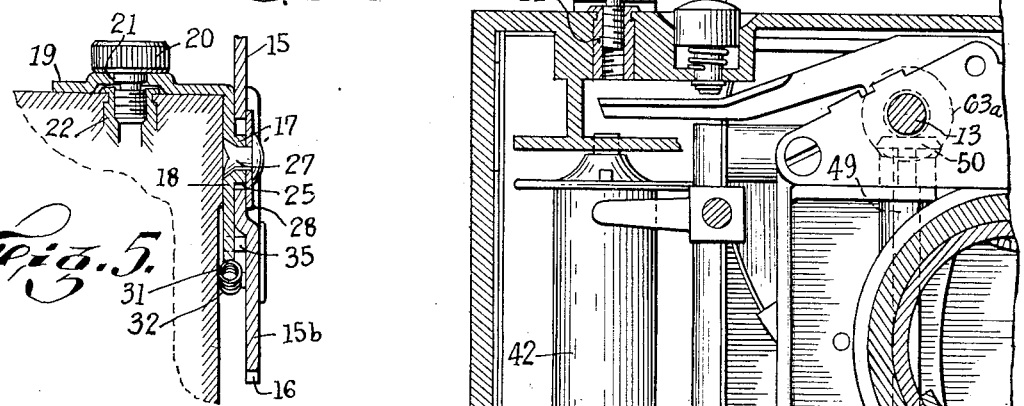
Fig. 5 is a cross-sectional view taken substantially on the line 5—5 of Fig. 2.
Fig. 8 is a cross-sectional view taken substantially on the line 8—8 of Fig. 2.
Figure 3:
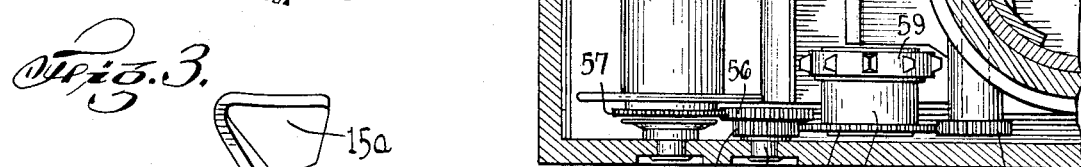
Fig. 3 is an end elevational view thereof.

Journaled in the camera casing is a shaft 49 (see Fig. 8) to which there is fixed at one end thereof a bevel gear 50, and at the other end thereof a pinion 51. The gears 50 and 51 are mounted for integral rotation with the shaft 49. Fixed to a rotatably mounted collar 52 for rotation therewith is a gear 53 adapted to mesh with the pinion 51. Mounted in the wall of the camera casing is a stationary shaft 54 on which is rotatably mounted a gear 55 provided with a hub. On the last named hub is fixed a second gear 56 for rotation with said gear 55. The said gear 56 is positioned so as to be in proper meshing position with a gear 57 mounted directly on the removable take-up spool 42. It is thus seen from the above description that when the shaft 49 is rotated, the spool 42 will be caused to rotate through the chain of gearing 51 through 57. A sprocket 58 fixed to the collar 52 cooperates with the perforations in the film for advancing the same In order to conveniently rotate the shaft 49 from the outside of the camera, there is provided the shaft 13 disposed at right angles to the shaft 49 and journaled in the camera. A portion of the shaft 13 which projects freely through the wall of the camera casing is provided with the winding knob 11. Mounted on that portion of the shaft disposed within the camera is a combination gear member 63 having bevel teeth 63a designed to mesh with the bevel gear 50.

The rapid winding device of my invention comprises an arm or flat lever 15 having a handle portion 15a at one end thereof and an offset outwardly flared fan-like portion 15b at the opposite end thereof. The periphery of the portion 15b is provided with gear teeth 16. The lever 15 is rotatably mounted on a hollow projecting stud 17, the said stud being a part of a wall 18 of an inverted L-shaped mounting bracket. The wall 18 of the mounting bracket is designed to overlie a portion of the front casing wall of the camera and the integrally joined bracket wall 19 is adapted to overlie a portion of the top casing wall. The bracket may be secured to the camera by a single thumb screw 20 passing through an aperture 21 in the bracket wall 19 and threadedly received in any suitable threaded opening in the top casing wall, such as for example the internally threaded cable release bushing 22.

The lever 15 is provided with a curved slot 25 of specific shape and design as shown, so that the center of curvature thereof is located at 26. The projecting stud 17 is freely received in the slot 25, thus allowing the center of rotation of the lever 15 to shift with respect to the gear teeth 16. A rivet 27 and washer 28 serve to confine the lever 15 to the bearing surface on the stud 17.

Mounted on the winding knob shaft 13 for rotation therewith is a pinion 30 adapted to mesh with the gear teeth 16 of the lever 15.

Figure 4:
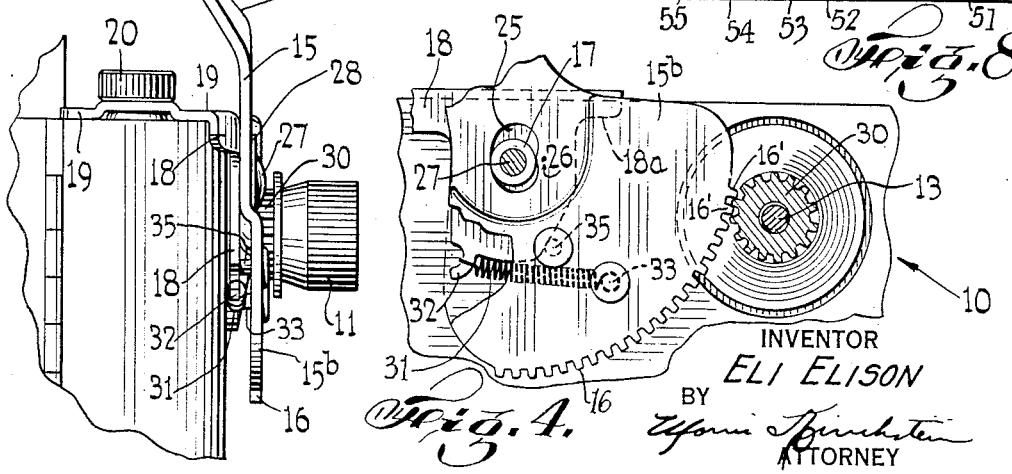
Fig. 4 is a view similar to Fig. 1, but with portions broken away to reveal the construction thereof.

The designing of the slot 25 to be kidney shaped and so that the center of curvature thereof is at 26 enables the lever teeth 16 to engage with the teeth of the pinion 30 whenever the stud 17 is in the upper end of the slot 25, as in Fig. 6 of the drawings, or substantially at the center of the said slot 25, as in Fig. 4. Also, by the specific design of the slot 25 it is seen that if the lever 15 were shifted so as to dispose the stud 17 in the lower end of the slot 25 (opposite to the position shown in Fig. 6), the teeth 16 will disengage from the pinion 30.

In Fig. 1 and 4 of the drawings, the lever 15 of the rapid winding device is shown in normal position, and is maintained in such position by an extended spring 31 having one end thereof fixed to a hooked portion 32 of the bracket arm 18 and the other end thereof fixed to a stud pin 33 fixed to the lever portion 15b. The spring 31 is disposed in the space between the offset portion 15b and the bracket arm 18 (see Fig. 5).

To effectively actuate the winding knob 11 to rotate through an angle approximating a complete turn, the operator of the camera merely pushes downwardly on the handle 15a of the lever 15 with one finger, without the necessity of altering his grip on the camera. This movement shifts the lever 15 to a position where the stud 17 is in the upper end of the slot 25, as in Fig. 6, and brings those teeth 16' adjacent one end of the gear teeth 16 into meshing engagement with the pinion 30. Continued downward pressure exerted on the handle 15a causes rotational movement of the lever 15 about the stud 17 until the said lever has been moved to the position shown in Fig. 7, in which position the pinion 30 has been rotated approximately a complete turn. As noted in Fig. 4, a stud 35 fixed to the lever portion 15b and adapted to abut an extending portion 18a of the bracket arm 18 serves to limit the amount of rotational movement of the lever 15 in a counterclockwise direction.

As clearly shown in Fig. 7, the bracket arm 18 is provided with a cammed edge 18b, upon which the spring 31 tends to rest while in stretched condition, as shown. Upon release of pressure on the handle portion 15a, the lever 15 will be caused to rotate in a clockwise direction back to its original position, due to the action of the spring 31. Due also to the action of the spring 31 and to the design of the slot 25, the lever 15 will be shifted laterally to the left, as viewed in Fig. 7, so that the teeth 16 will be drawn away from and will clear the teeth of the pinion 30 during such return movement, up to the point where the gear teeth 16' arrive adjacent the said pinion teeth. At such point, as shown in Figs. 1 and 4, the teeth 16' will be partially in mesh with the pinion 30, due to the design of the slot 25 and to the fact that the stud pin 35 strikes the cammed edge 18b of the bracket arm 18, to shift the lever 15 with respect to the stud 17, so that the teeth 16' will partially engage the teeth of the pinion 30. This partial meshing of the teeth 16' with the pinion 30 serves to furnish a positive starting action for the next winding of the knob shaft 13. The amount of mesh between the teeth 16' and the teeth of the pinion 30 in this latter position is such that manual rotational movement of the knob 11 will not cause corresponding rotational movement of the lever 15, so that the knob 11 may be rotated independently of the lever 15.

The shaft 13 is provided with a spring member 40 arranged as shown in Fig. 2 and as described in the said Patent No. 2,233,390 so that it will rotate only in a clockwise direction and, therefore, the gear 30 will not rotate in any but a counterclockwise direction with respect to the showing in Figs. 1 and 4.

It is seen from the above described construction that the effective operation of my improved rapid winding mechanism is dependent in certain respects upon the construction and arrangement of the slot 25.

The slot 25 must be so positioned with respect to the teeth 16 that when the stud 17 is positioned in the upper end thereof, as in Fig. 6, the said teeth 16 will be in mesh with the pinion 30, and when the stud 17 is positioned in the opposite end of the slot 25 the teeth 16 will be out of mesh with the pinion. It is also noted that the slot 25 is so designed that during the entire time that pressure is applied on the handle portion 15a the stud 17 will be retained in the same end of the slot, as shown in Figs. 6 and 7, to maintain constant mesh of the teeth 16 with the pinion 30 during the counterclockwise rotational movement of the lever 15.

It will thus be seen that there is provided a device in which the several objects of this invention are achieved, and which is well adapted to meet the conditions of practical use.

As various possible embodiments might be made of the above invention, and as various changes might be made in the embodiments above set forth, it is to be understood that all matter herein set forth or shown in the accompanying drawings is to be interpreted as illustrative and not in a limiting sense.

Having thus described my invention, I claim as new and desire to secure by Letters Patent:

1. For use with a camera having a winding shaft for winding a film and a gear member fixed to said winding shaft for rotation therewith, a rapid winding device comprising a manually operable lever provided with arcuately disposed gear teeth adapted to mesh with the teeth of said gear member, said lever having a slot, and means for rotatably mounting said lever on said camera, said last named means comprising a stationary bracket member having a fixed projection thereon on which the edges of said slot are transversely slidably disposed, whereby said lever may be shifted transversely relative to said projection to unmesh the gear teeth on said lever from said gear member.

2. For use with a camera having a winding shaft for winding a film and a gear member fixed to said winding shaft for rotation therewith, a rapid winding device comprising a lever, said lever having a gear toothed portion adapted to mesh with the teeth of said gear member, said lever having an integral handle portion for manual operation thereof, and means for rotatably mounting said lever on said camera, said last named means including means for permitting said lever gear teeth to move away from and out of mesh with said gear member.

3. For use with a camera having a winding shaft for winding a film and a gear member fixed to said winding shaft for rotation therewith, a rapid winding device comprising a lever, said lever having a gear toothed portion adapted to mesh with the teeth of said gear member, and a handle portion for manually actuating said lever, a slot in said lever disposed between said handle and said gear toothed portion, and means for rotatably mounting said lever on said camera, said last named means comprising a bracket member having a projecting portion received in said lever slot, said slot being so constructed and arranged as to permit the shifting of said lever with respect to said projecting portion.

4. For use with a camera having a winding shaft for winding a film and a gear member fixed to said winding shaft for rotation therewith, a rapid winding device comprising a lever, said lever having a gear toothed portion adapted to mesh with the teeth of said gear member, and a handle portion for manually actuating said lever, a slot in said lever disposed between said handle and said gear toothed portion, means for rotatably mounting said lever on said camera, said last named means comprising a bracket member having a projecting portion received in said lever slot, said slot being so constructed and arranged as to permit the rotational and shifting movement of said lever with respect to said projecting portion, and means for mounting said bracket member on said camera.

5. For use with a camera having a winding shaft for winding a film and a gear member fixed to said winding shaft for rotation therewith, a rapid winding device comprising a lever, said lever having a gear toothed portion adapted to mesh with the teeth of said gear member, and a handle portion for manually actuating said lever, a slot in said lever disposed between said handle and said gear toothed portion, means for rotatably mounting said lever on said camera, said last named means comprising a bracket member having a projecting portion received in said lever slot, said slot being so constructed and arranged as to permit the shifting of said lever with respect to said projecting portion, and spring means for normally maintaining said projecting portion spaced from one end of said slot.

6. For use with a camera having a winding shaft for winding a film and a gear member fixed to said winding shaft for rotation therewith, a rapid winding device comprising a lever, said lever having a gear toothed portion adapted to mesh with the teeth of said gear member, and a handle portion for manually actuating said lever, a slot in said lever disposed between said handle and said gear toothed portion, means for rotatably mounting said lever on said camera, said last named means comprising a bracket member having a projecting portion received in said lever slot, and spring means for normally maintaining said projecting portion spaced from one end of said slot, said lever slot being so constructed and arranged with respect to said projecting portion whereby a force applied to said handle portion will cause the toothed portion of said lever to shift in a direction toward said gear member and to then rotate said lever about said projecting portion in one direction against the action of said spring while maintaining said gear member and said toothed portion in mesh to effectively wind said film.

7. For use with a camera having a winding shaft for winding a film and a gear member fixed to said winding shaft for rotation therewith, a rapid winding device comprising a lever having a gear toothed portion adapted to mesh with the teeth of said gear member, and a handle portion, a slot in said lever, means for rotatably mounting said lever on said camera, said last named means comprising a bracket member having a projecting portion received in said lever slot, spring means for normally maintaining said projecting portion spaced from one end of said slot, said lever slot being so constructed and arranged with respect to said projecting portion whereby a force applied to said handle portion will cause the toothed portion of said lever to shift into meshing relationship with said gear member and to be rotated about said projecting portion in one direction against the action of said spring to effectively wind said film, said spring means being adapted, upon release of the force applied to said handle portion, to restore the said lever to its original normal position.

8. For use with a camera having a winding shaft for winding a film and a gear member fixed to said winding shaft for rotation therewith, a rapid winding device comprising a lever having a gear toothed portion adapted to mesh with the teeth of said gear member, and a handle portion, a slot in said lever, means for rotatably mounting said lever on said camera, said last named means comprising a bracket member having a projecting portion received in said lever slot, spring means for normally maintaining said projecting portion spaced from one end of said slot, said lever slot being so constructed and arranged with respect to said projecting portion whereby a force applied to said handle portion will cause the toothed portion of said lever to shift into meshing engagement with said gear member and to rotate said lever about said projecting portion in one direction against the action of said spring, to effectively wind said film, said spring means being adapted, upon release of the force applied to said handle portion, to restore the said lever to its original normal position, and means for causing said lever to be so shifted that the toothed portion thereof will be out of mesh with said gear member upon such restoring movement of said lever.

9. For use with a camera having a winding shaft for winding a film and a gear member fixed to said winding shaft for rotation therewith, a rapid winding device comprising a lever, having a gear toothed portion adapted to mesh with the teeth of said gear member and a handle portion, a slot in said lever, means for rotatably mounting said lever on said camera, said last named means comprising a bracket member having a projecting portion received in said lever slot, spring means for normally maintaining said projecting portion spaced from one end of said slot, said lever slot being so constructed and arranged with respect to said projecting portion whereby a force applied to said handle portion will cause the toothed portion of said lever to shift into meshing engagement with said gear member and to rotate said lever about said projecting portion in one direction against the action of said spring to effectively wind said film, said spring means being adapted, upon release of the force applied to said handle portion, to restore the said lever to its original normal position, and means cooperating with said spring for causing said lever to be shifted so that the toothed portion thereof will be out of mesh with the teeth of said gear member upon such restoring movement of said lever, with the exception of several starting teeth of said toothed lever portion which will then be partially in mesh with said gear member so as to be in readiness for the next winding action.

10. For use with a camera having a winding shaft for winding a film and a gear member fixed to said winding shaft for rotation therewith, a rapid winding device comprising a lever, having a gear toothed portion adapted to mesh with the teeth of said gear member and a handle portion, a slot in said lever, means for rotatably mounting said lever on said camera, said last named means comprising a bracket member having a projecting portion received in said lever slot, spring means for normally maintaining said projecting portion spaced from one end of said slot, said lever slot being so constructed and arranged with respect to said projecting portion whereby a force applied to said handle portion will cause the toothed portion of said lever to shift into meshing engagement with said gear member and to then rotate said lever about said projecting portion in one direction against the action of said spring to effectively wind said film, said spring means being adapted, upon release of the force applied to said handle portion, to restore the said lever to its original normal position, and means for causing said lever to be shifted so that the toothed portion thereof will be out of mesh with the teeth of said gear member upon said restoring movement of said lever, with the exception of several starting teeth of said toothed lever portion which will then be partially in mesh with said gear member so as to be in readiness for the next winding action, said last named means comprising a pin fixed to said lever and adapted to contactively engage a cammed edge of said bracket member.

11. A rapid film winding device for a camera, comprising a winding shaft, a gear fixed to said winding shaft for rotation therewith, a lever, said lever comprising a gear toothed portion adapted to mesh with the teeth of said gear, a handle portion and a kidney-shaped slot, and means for rotatably mounting said lever on said camera, said last named means comprising a bracket member having a projecting portion received in said lever slot, said slot being so constructed and arranged as to permit the rotational and shifting movement of said lever with respect to said projecting portion.

12. For use with a camera having a winding shaft for winding a film and a gear member fixed to said winding shaft for rotation therewith, a rapid winding device comprising a lever, said lever having an arcuate gear toothed portion adapted to mesh with the teeth of said gear member, a handle portion for manually actuating said lever, means for rotatably mounting said lever on said camera, and means for shifting said lever with respect to said camera in the plane of said toothed portion, whereby the toothed portion of said lever may be unmeshed from the teeth of said gear member.

ELI ELISON.